US012675778B2

(12) United States Patent
Bradley et al.

(10) Patent No.: US 12,675,778 B2
(45) Date of Patent: \*Jul. 7, 2026

(54) NONHUMAN SOCIAL MEDIA PRESENCE

(71) Applicant: AT&T Intellectual Property I, L.P., Atlanta, GA (US)

(72) Inventors: Nigel Bradley, Canton, GA (US); Eric Zavesky, Austin, TX (US); James Pratt, Round Rock, TX (US); Ari Craine, Marietta, GA (US); Robert Koch, Norcross, GA (US)

(73) Assignee: AT&T Intellectual Property I, L.P., Atlanta, GA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/915,528

(22) Filed: Oct. 15, 2024

(65) Prior Publication Data

US 2025/0037213 A1 Jan. 30, 2025

Related U.S. Application Data

(63) Continuation of application No. 17/662,105, filed on May 5, 2022, now Pat. No. 12,148,051.

(51) Int. Cl.
*G06Q 10/40* (2026.01)

(52) U.S. Cl.
CPC .................................... *G06Q 10/40* (2026.01)

(58) Field of Classification Search
CPC ....................................................... G06Q 50/01
See application file for complete search history.

(56) References Cited

U.S. PATENT DOCUMENTS 10,489,453 B2 \* 11/2019 Duda .................. G06F 16/7867
RE47,992 E \* 5/2020 Logue ...................... F24F 11/62

10,853,733 B2 12/2020 Fadell et al.
2021/0004409 A1 \* 1/2021 Zamora Duran ..... G06F 16/908
2021/0012646 A1 1/2021 Kazi et al.

FOREIGN PATENT DOCUMENTS

KR 20190122900 A 10/2019

OTHER PUBLICATIONS

"Hue Product Security Advisory", https://web.archive.org/web/20220125145927/https://www.philips-hue.com/en-us/support/securityadvisory#Do_you_support_older_firmware_versions_of_Philips_Hue_products, Jan. 25, 2022, 4 pgs.

\* cited by examiner

*Primary Examiner* — Jessica Lemieux
*Assistant Examiner* — Emily M. Kraisinger
(74) *Attorney, Agent, or Firm* — Guntin & Gust, PLC; Miyoung Shin

(57) ABSTRACT

The disclosed technology is directed towards devices (nonhuman entities) participating in social networks. Devices that join a nonhuman social network can share information, can learn from other devices, can assist in performing tasks and so forth. A device can search for an existing nonhuman social network that matches its criteria for joining a nonhuman social network, such as a nonhuman social network of the same type of devices, a nonhuman social network within a certain neighborhood, and so on. A device can form a nonhuman social network if one does not exist that meets the device's social network join criteria. A device's user may need to give approval to join and/or form a social network. A human social network can interact with a nonhuman social network, and there can be hybrid social networks of both human and nonhuman entities. A device can change social networks over time.

20 Claims, 13 Drawing Sheets

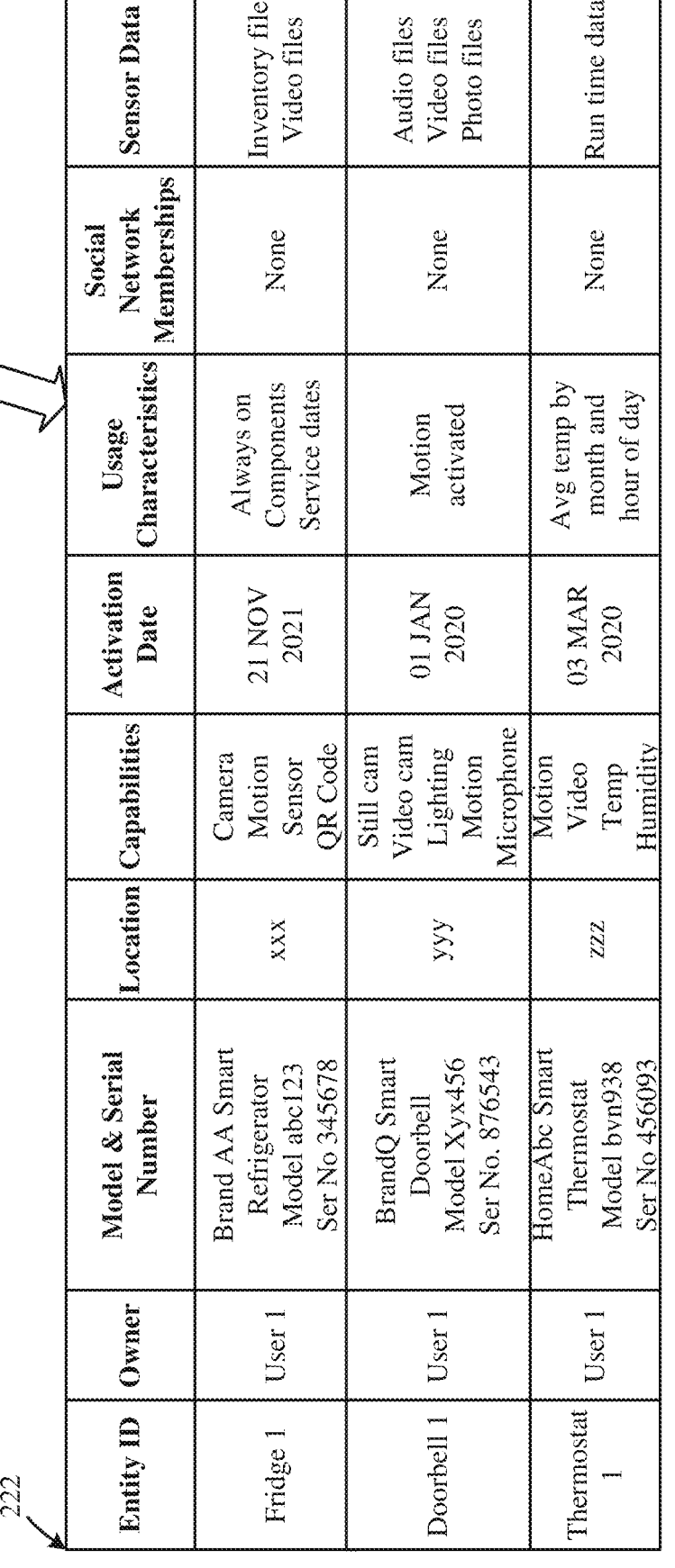

| Entity ID | Owner | Model & Serial Number | Location | Capabilities | Activation Date | Usage Characteristics | Social Network Memberships | Sensor Data |
|---|---|---|---|---|---|---|---|---|
| Fridge 1 | User 1 | Brand AA Smart Refrigerator Model abc123 Ser No 345678 | xxx | Camera Motion Sensor QR Code | 21 NOV 2021 | Always on Components Service dates | None | Inventory file Video files |
| Doorbell 1 | User 1 | BrandQ Smart Doorbell Model Xyx456 Ser No. 876543 | yyy | Still cam Video cam Lighting Motion Microphone | 01 JAN 2020 | Motion activated | None | Audio files Video files Photo files |
| Thermostat 1 | User 1 | HomeAbc Smart Thermostat Model bvn938 Ser No 456093 | zzz | Motion Video Temp Humidity | 03 MAR 2020 | Avg temp by month and hour of day | None | Run time data |

Non-Human Entity Profiles Database

Figure 6:
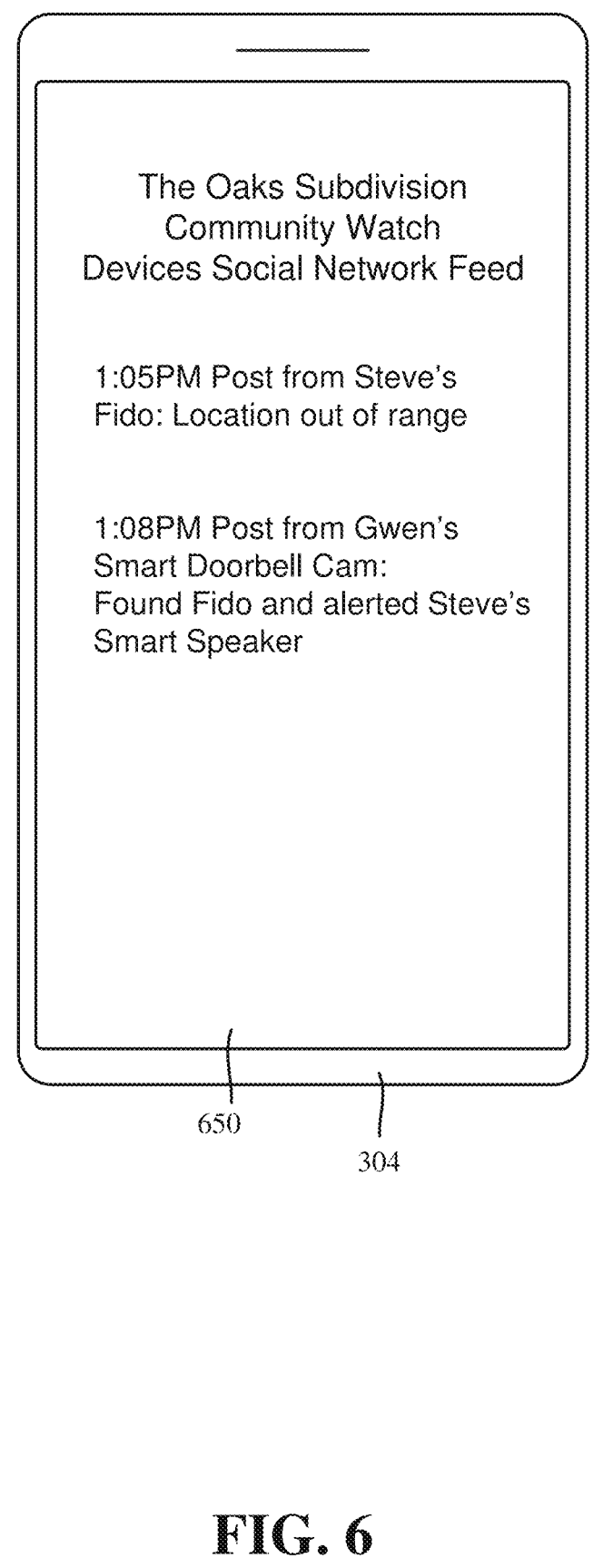

The Oaks Subdivision
Community Watch
Devices Social Network Feed

1:05PM Post from Steve's
Fido: Location out of range

1:08PM Post from Gwen's
Smart Doorbell Cam:
Found Fido and alerted Steve's
Smart Speaker

| Entity ID | Owner | Model & Serial Number | Location | Capabilities | Activation Date | Usage Characteristics | Social Network Memberships | Sensor Data | Performance Data |
|---|---|---|---|---|---|---|---|---|---|
| Doorbell 2 | User 2 | BrandP Smart Doorbell Model Xyx456 Ser No 876543 | nnn | Still cam Video cam Lighting Motion Microphone | 01 JAN 2022 | Motion activated | The Oaks Subdivision | Audio files Video files Photo files | • 95% efficient motion detection • Performed 25 social network assists • Identified 3 unknown people in network • 25 LIKES |

322(u)

724

Non-Human Entity Profiles Database

MOBILE HANDSET

APPLICATIONS — 1206

CLIENT (STORE, DISCOVERY, PLAY) — 1246

1208

FIRMWARE

1238

TRIGGER COMPONENT

1218 — 1220

SUBSCRIBER IDENTITY SYSTEM

1230

VIDEO COMP

1236

HYSTERESIS COMPONENT

1210

COMMUNICATION COMPONENT

1211 — 1213

CELL TCVR | WIFI TCVR

1212

DISPLAY

1240

SIP CLIENT

1222

CAMERA

1202

PROCESSOR

1214

SERIAL I/O INTERFACE

1204

MEMORY

1232

LOCATION COMPONENT

1235

USER INPUT

1216

AUDIO I/O

1224

POWER SOURCE

1226

POWER I/O

NONHUMAN SOCIAL MEDIA PRESENCE

CROSS REFERENCE TO RELATED APPLICATIONS

This application is a continuation of U.S. patent application Ser. No. 17/662,105 filed on May 5, 2022. All sections of the aforementioned application are incorporated herein by reference in their entirety.

TECHNICAL FIELD

The subject application relates to the interaction of non-human entities (e.g., Internet-of-Things, or IoT devices) with humans and nonhumans via social media communities.

BACKGROUND

With an increasing abundance of connected intelligent devices and sensors, a great deal of information is collected for various usage scenarios. Improved distribution of such information can facilitate even more value in other usage scenarios.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 2 is an example representation of a data structure containing records and fields for various nonhuman entity devices, in accordance with various aspects and embodiments of the subject disclosure.

FIG. 6 is an example representation of a user device interface that can be used for obtaining information from a nonhuman entity via participation in a social network, in accordance with various aspects and embodiments of the subject disclosure.

FIG. 7 is an example representation of a data structure containing records and fields for a nonhuman entity device, including a field for device self-promotion, in accordance with various aspects and embodiments of the subject disclosure.

DETAILED DESCRIPTION

Figure 1:
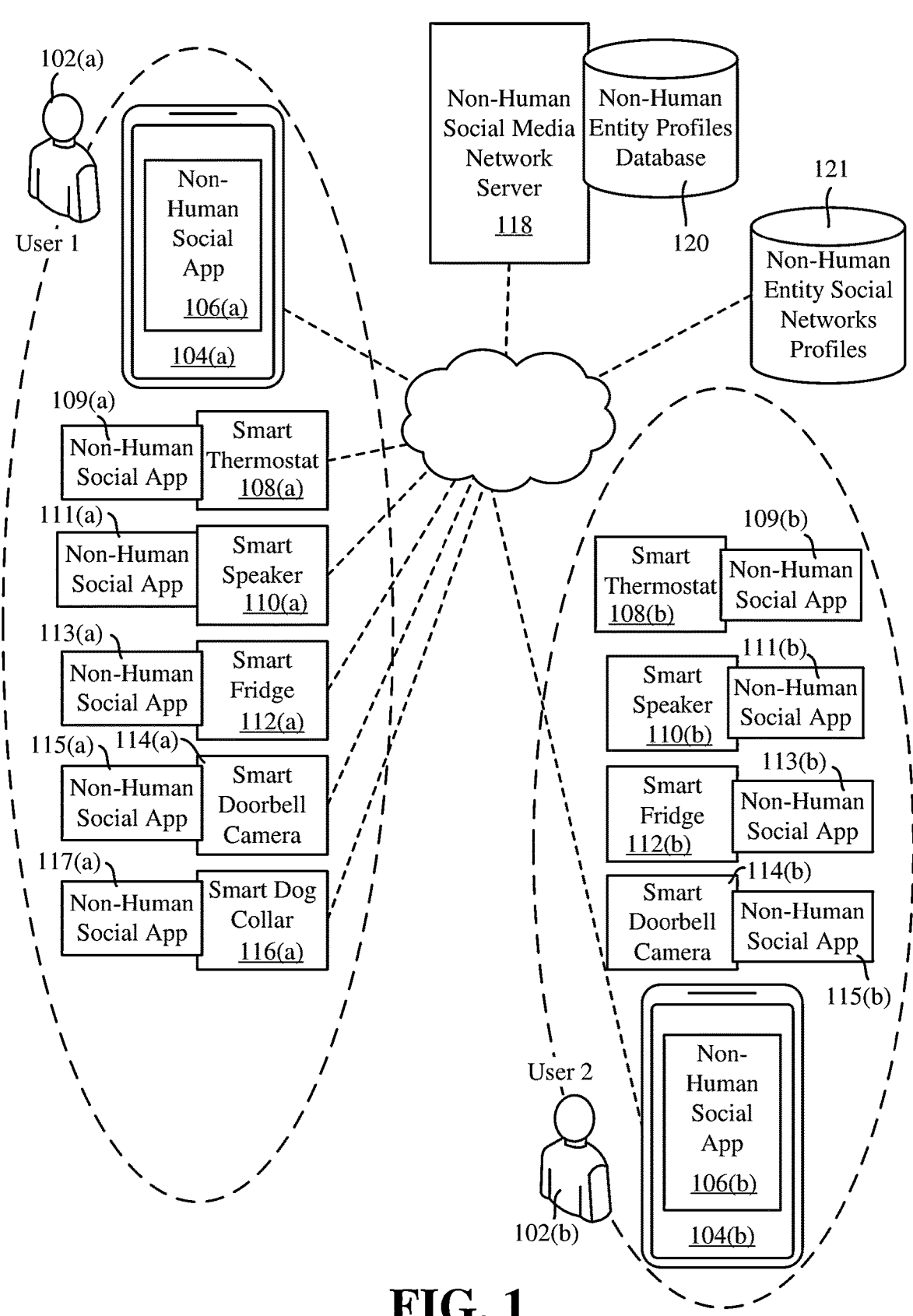
FIG. 1 is an example block diagram representation of nonhuman entity devices coupled to a nonhuman social media network server, in accordance with various aspects and embodiments of the subject disclosure.

The technology described herein is generally directed towards social media communities for nonhuman entities, such as IoT (Internet-of-Things) devices, or entities for which connected devices act as a proxy, such as a dog that is served by a smart dog collar device acting as a proxy. As will be understood, a hybrid social media community can exist in which nonhuman entities can interact with human entities, and vice-versa.

In one implementation, a nonhuman entity such as an IoT device can find a social media community to join, such as by matching join criteria, based on device profile data (e.g., describing device characteristics), with data that characterizes the social media community. In one implementation, such as when no matching social media community exists, a nonhuman entity can create a social media community to thereby interact with other nonhuman entities and/or human entities that join. A nonhuman entity can join more than one social media community, as well as change a social media community, such as if device characteristics change over time and apply more appropriately to a different social media community.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As shown in the example of FIG. 1, one or more users (user 1 102(*a*) and user 2 102(*b*)) each have a mobile device 104(*a*) and 104(*b*) with a nonhuman social network application (app) program 106(*a*) and 106(*b*), respectively. In this example, the users 102(*a*) and 102(*b*) use their respective applications 106(*a*) and 106(*b*) to enable one or more devices each owns to participate in nonhuman social networks. As used herein, the term "device" refers to any nonhuman entity, including a sensor, which can output relevant information for consumption by a social media network.

The example (non-limiting) devices associated with (e.g., owned by) user 1 102(*a*) include a smart thermostat 108(*a*) with accompanying nonhuman social app 109(*a*), smart speaker 110(*a*) with accompanying nonhuman social app 111(*a*), smart refrigerator (fridge) 112(*a*) with accompanying nonhuman social app 113(*a*), smart doorbell camera 114(*a*) with accompanying nonhuman social app 115(*a*), and smart dog collar 116(*a*) with accompanying nonhuman social app 117(*a*). The example (non-limiting) devices of user 2 102(*b*) include a smart thermostat 108(*b*) with accompanying nonhuman social app 109(*b*), smart speaker 110(*b*) with accompanying nonhuman social app 111(*b*), smart refrigerator (fridge) 112(*b*) with accompanying nonhuman social app 113(*b*), and smart doorbell camera 114(*b*) with accompanying nonhuman social app 115(*b*); (there is no smart dog collar associated with the user 102(*b*). As is understood, many other users may have similar devices as well as others, and a user may not have the same one(s) shown in the example of FIG. 1.

As shown in FIG. 1, a nonhuman social media network server 118 coupled to a nonhuman entity profile database 120 provides the ability for devices to form and/or join and participate in nonhuman social media networks. As described herein, a nonhuman social media network can couple to a human social media network, and/or a hybrid nonhuman social media network and human social media network can exist, that is, a single hybrid social media network can be created, joined and participated in by both human and nonhuman entities. As also shown in FIG. 1, a data store 121 of nonhuman entity social network profile data is coupled to the nonhuman social media network server 118 and/or the nonhuman entity profile database 120.

Thus, the devices can have intelligence, connectivity and various types of sensing and processing capabilities, along with data storage capabilities and applications used to communicate with the nonhuman social network server 118 and other members of their nonhuman social networks. Note, however, that as exemplified in FIG. 1, in one or more implementations, some devices may, but need not, directly interface with the nonhuman social network server 118; for example, the devices of user 2 102(*b*) can couple to the nonhuman social network server 118 via the nonhuman social application program 106(*b*) or via some other connected device. For example, a dedicated device (e.g., coupled to a wireless network component such as a home router) can be installed with application program functionality that allows the other devices to connect to it and thereby participate in a nonhuman social media network without connecting directly; as another example, a smart thermostat can be coupled to a smart doorbell camera that communicates on behalf of both to corresponding social media networks, and so on.

FIG. 2 shows a data structure 222 by which each device has a profile stored in the nonhuman entity profiles database 120. Each device profile may contain data such as that shown in example fields (Entity ID, Owner, Model & Serial Number, Location, Capabilities, Activation Date, Usage Characteristics, Social Network Memberships, and Sensor Data) as well as other types of data. Note that some fields can be relatively dynamic, such as to update the location data for a portable smart speaker or dog collar, while other fields are static or mostly static. Based on the profile data, social media networks that are relevant to a device can be found and joined. For example, a smart refrigerator can join a social media network comprising other refrigerators, possibly of the same model or general type, so as to learn from as well as provide data to the social media network. A location-based social media network can be formed, e.g., of only those smart doorbells within a certain neighborhood.

Figure 3:
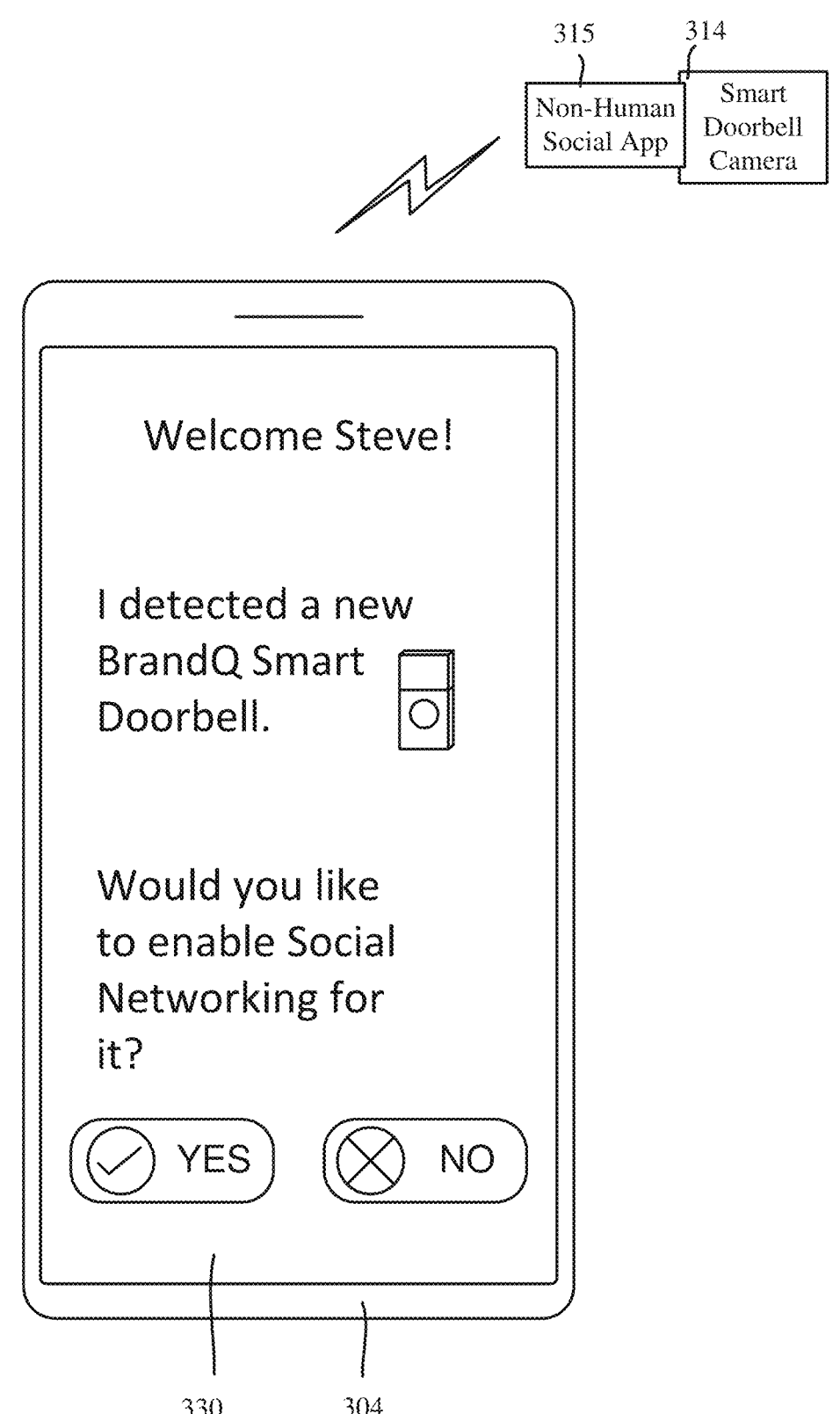
FIG. 3 is an example representation of a user device interface that can be used for authorizing an activated nonhuman entity to seek participation in a social network, in accordance with various aspects and embodiments of the subject disclosure.

FIG. 3 shows device association after the device is activated, e.g., initially powered-up. In the example of FIG. 3, a user device such as a smartphone 304 (or tablet, PC or the like) interacts with a smart device, which in this example is a smart doorbell camera 314 with non-human social app 315. In this way, the smart doorbell camera 314 need not have its own interactive display, for example, but can couple via BLUETOOTH, Wi-Fi, cellular connection or the like to interact with a human. Notwithstanding, it is feasible for such a device to have its own human interface.

In this example, the user who is the owner of a new device may choose whether or not to have it participate in nonhuman entity social networking upon activation of the device. As shown, when the device is activated such as when power is first provided, the device may communicate to announce its presence and activation. The user's device such as the smartphone 304 displays a choice to the user as to whether or not to enable the new device for social networking. If the user decides to enable social networking for the device, the device nonhuman social app 315 registers itself (or possibly does so via the smart device 304) in the nonhuman entity profiles database 120 and associates itself with its owner, User 1, in the database 120. Note that in the event of the user choosing not to register the device, the registration option can be chosen at a later time by the user by interacting in a suitable way with the device. Further note that a device can be configured by default (and possibly sold and advertised as such) to register itself for social networking participation, possibly with a disable/user override option offered. A user can, for example, independently add owner information to a device database, or choose to have a device participate but remain anonymous with respect to its owner's identity. Still further, a device can give approval to another device, e.g., a user can instruct a smartphone to approve all of her smart devices for nonhuman social networking participation.

Returning to FIG. 1, the database 120 is coupled to the non-human entity social networks profiles data store 121 that maintains a collection of the nonhuman entities' social networks that have been created. Each nonhuman entity social network may have profile data that is a collective profile created to best represent the devices that are members of that network. Alternatively, this may be accomplished by having an indicator in each nonhuman entity's profile data of each of the social networks with which that nonhuman entity is a member. In any event, a searchable representation is made of the devices that are members of a nonhuman entity social network, such that a collective representation of the makeup of each social network is available.

When a device (such as the device 314 of FIG. 3) has been given permission by the user (or by default) to participate in social networking, the device may autonomously and continuously (or regularly/occasionally) search for one or more social networks in which to become a member. This searching may be accomplished by the device sending a request from its app 315 to the server 118 to search for nonhuman entity social network profiles that match its own characteristics. For example, based on one or more join criteria, which may be user configurable, the new smart doorbell 314 may find a match with other smart doorbells in the same subdivision or by the same manufacturer.

Figure 4:
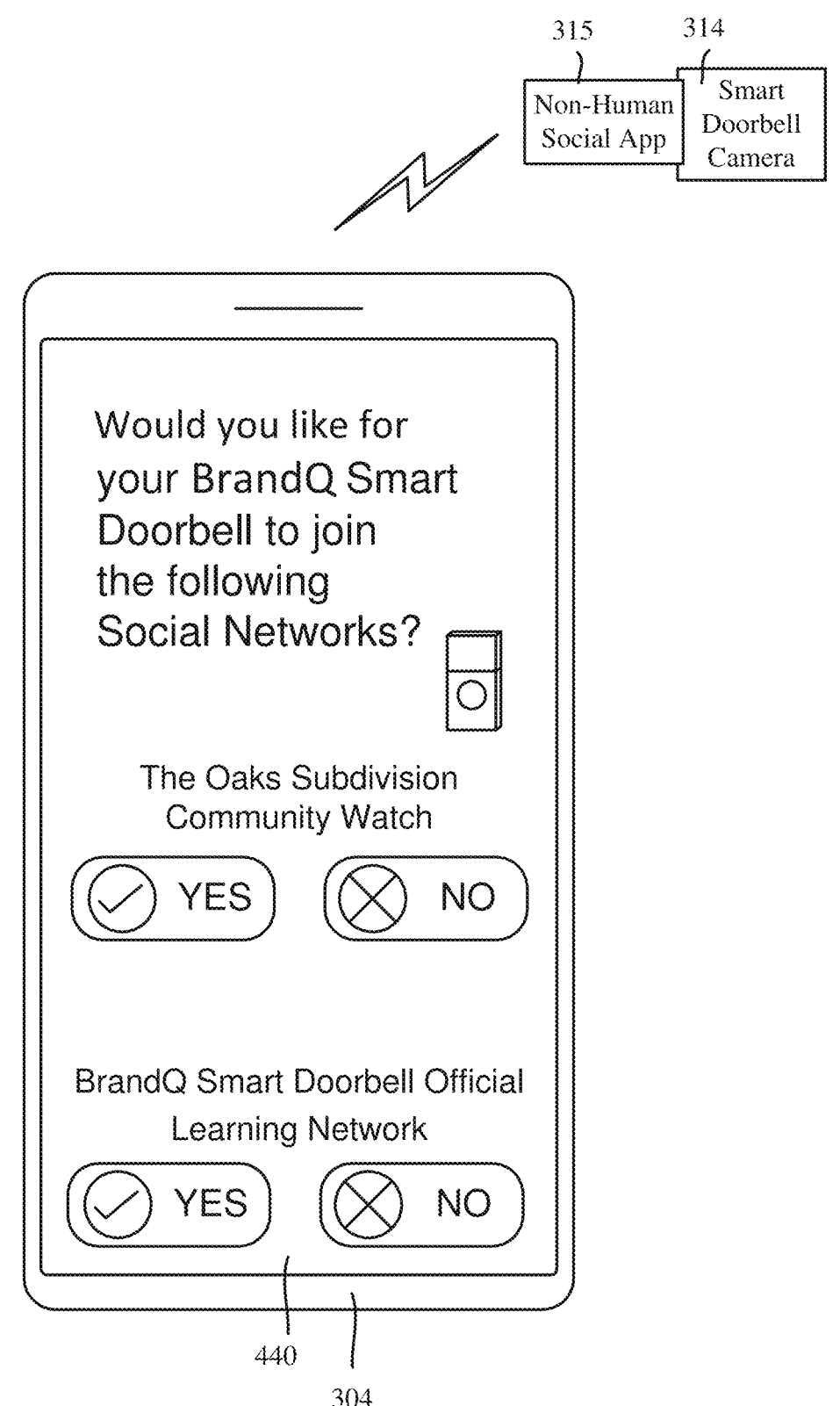
FIG. 4 is an example representation of a user device interface that can be used for joining an activated nonhuman entity to one or more social networks, in accordance with various aspects and embodiments of the subject disclosure.

Upon finding a match, the device 304 may autonomously join one or more social networks. Alternatively, as shown in the example, of FIG. 4, the device 304 may first be configured to ask its user (e.g., via an interface 440) for permission to join, which can be selective (join one matching social network, but not another) if more than one match is found. As noted, this may be a continuous/regular/occasional search process by the device, as over time new social networks may be formed, and/or the device's characteristics may change, such that the network(s) to which a device matches may therefore also change over time.

Figure 5:
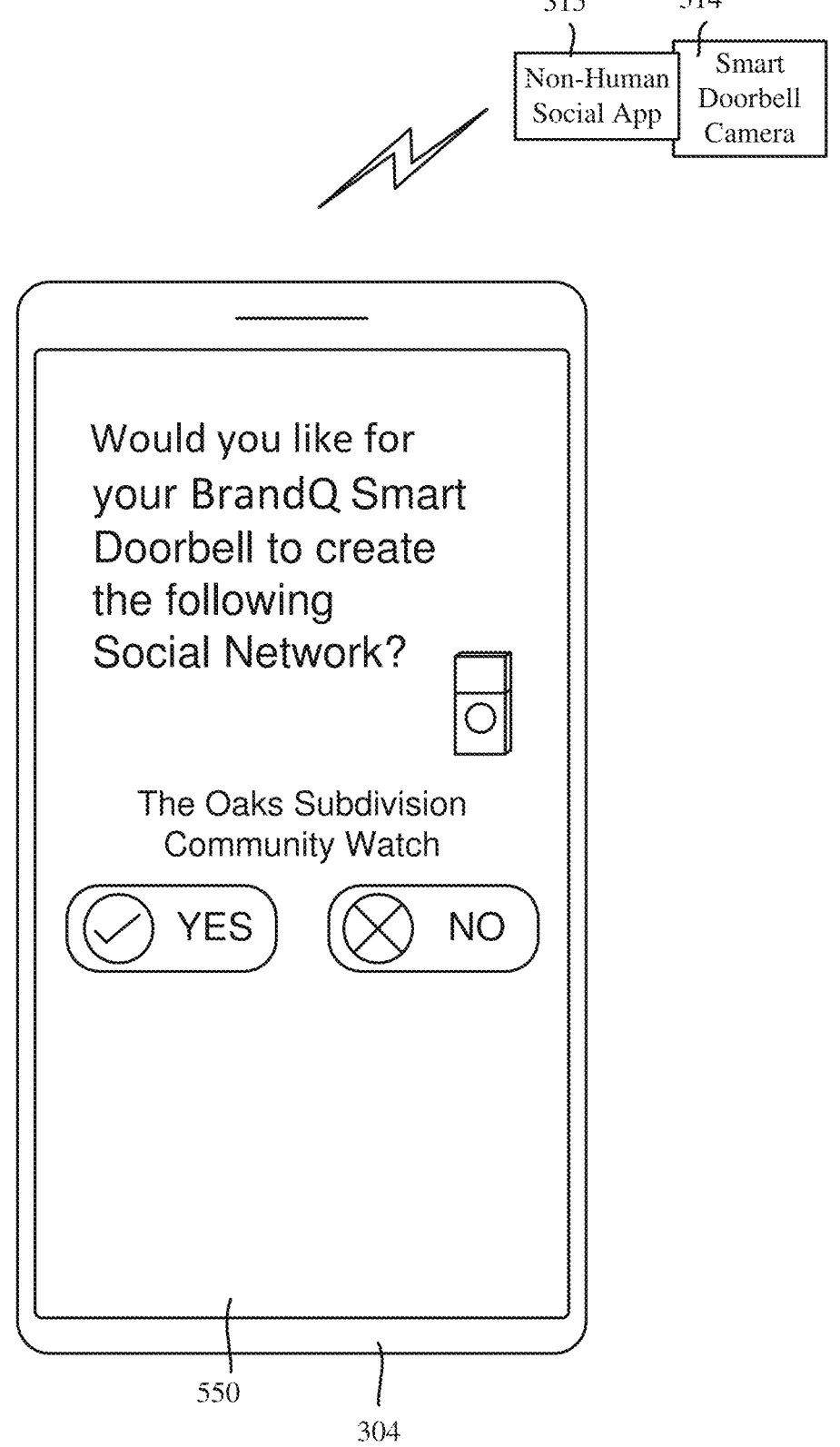
FIG. 5 is an example representation of a user device interface that can be used for creating a social network, in accordance with various aspects and embodiments of the subject disclosure.

FIG. 5 represents another device capability, namely autonomous creation of a new social network. To this end, the smart device 314 may identify the opportunity to create a new social network that does not already exist. For example, if the device 314 detected that there were no social networks for devices with security camera capabilities within the surrounding area of the location of the device, it may create or ask for permission (via the example interface 550 or the like) to create such a network. Note that the device 314 may be a member of one or more networks, such as the manufacturer's network, and create another, such as one based on the location of the device.

As such, the devices may be associated with their owners and find, create, and interact with other devices via nonhuman social networks. A device can interact with device(s) also owned by the user, and/or devices owned by other users. There can also be social network subgroups within a social network group. For example, there may be a large device group of device type X, a smaller subgroup of device type X in the United States, and a still smaller subgroup of device type X in the United States within a ten-mile radius of each user's device.

Once two or more devices belong to a common social network, a number of resulting use case applications may be provided. In one example, assistance within a social network can be obtained, such as if User 1's smart doorbell 114(1) detects a face that it does not recognize in its own database. For assistance, the smart doorbell may post an image of the face to the server 118, and create a request for other cameras in the device's social network(s) for assistance in recognizing the identity of the face. This is somewhat analogous to having a traditional social networking post where a user might post a photo to a neighborhood group and ask if anyone recognizes who it is; (however nonhuman social networking as described herein does not need human involvement). A device may also tie in with a law enforcement database, which may be a member of a matching social network, and therefore enable suspected criminals to be identified. Assistance/identification applications can therefore be applied to humans, lost pets or other applications.

Another application for nonhuman entity social networks is diagnosis within a social network. There can be monitoring among devices by which the identification of potential problems can be diagnosed. For example, User 1 102(*a*) and User 2 102(*b*) may both have the same smart refrigerator model, and may have instructed their respective refrigerators 112(*a*) and 112(*b*) to join the official manufacturer's social network for that model. Each refrigerator in the network may report events and operating trends to the server 118, and each individual device may compare its own conditions with those of the collective members of the network to determine if the device is operating as well as other devices of the group. A device can learn from their activities how to update itself, request a hardware update, adjust its own settings, or prompt its user on usage behaviors—e.g., "80% of other user's refrigerators have colder milk by storing it on the 2nd shelf instead of in the door, as you do."

Another example application relates to instructions within a social network, wherein devices within a social network may instruct one another on actions to take. For example, if all of the devices shown are all members of a nonhuman entity social network for a neighborhood subdivision, User 1's smart dog collar could report to the server its location. If its location is outside a range, the server 118 may send a call out to devices with camera capabilities near the location to monitor for the detection of a dog. If a dog is detected via an analysis of the video on the Smart Doorbell Camera of User 2, the doorbell may post the live video feed to a feed for the social network for the subdivision. An alert may also be sent to User 1 via various means, including an audio alert to their smart speaker, or as shown in FIG. 6, as a notification 650 rendered on a device such as the smartphone 304. The devices in the social network may post events to a feed that may also be seen by the users via their interface, e.g., "Steve, the doorbells talked and the found your dog."

FIG. 7 shows how a device may record its own performance data and store the performance data in its profile, e.g., in an extended field 724 of the (updated) data structure 322(*u*). This facilitates device self-promotion, such as via data that is collected based on performance tasks accomplished by the device, based on self-evaluation of efficiency via self-audits, or other operations. If a first entity in the network performs a task, provides information, provides intelligence, and/or provides another service for another entity, that first entity may be given the equivalent of a "thumbs up like" by the second entity. The device may use this performance data in order to promote itself by posting it as available data for other devices to see and consider as they may wish to connect with that device in another social network. There can be an "influencer" mode or the like in which the device tries to brag/advertise to others after getting thumbs-up comments. It is also feasible for a device to ask for guidance based on performing tasks; e.g., a refrigerator may via self-evaluation detect a higher temperature than the norm for other refrigerators of its type or relative to past measurements, and ask for help; guidance such as "cleaning the coils fixed a similar problem a few months ago."

Figure 8:
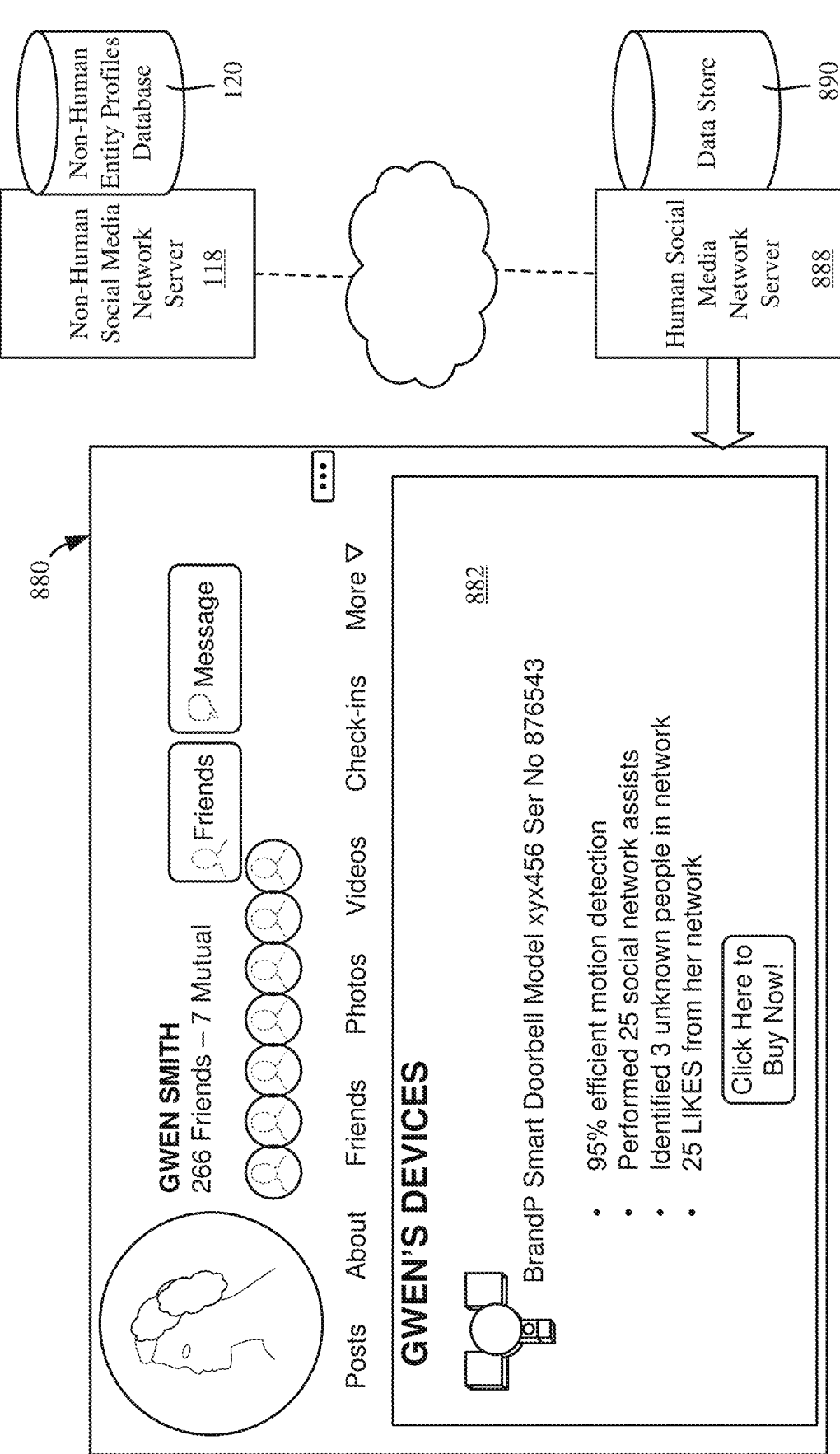
FIG. 8 is an example representation of a user interface by which a human can self-promote a nonhuman entity device, in accordance with various aspects and embodiments of the subject disclosure.

FIG. 8 shows an example of another concept, directed towards nonhuman entity self-promotion via its owner. As shown in the posting 880 containing the device portion 882 of FIG. 8, a user may optionally provide a link between the nonhuman social server and a human social network server in which the user participates (via server 888 and data store 890). This allows for the device to promote itself through the user and the user's human social network.

Figure 9:
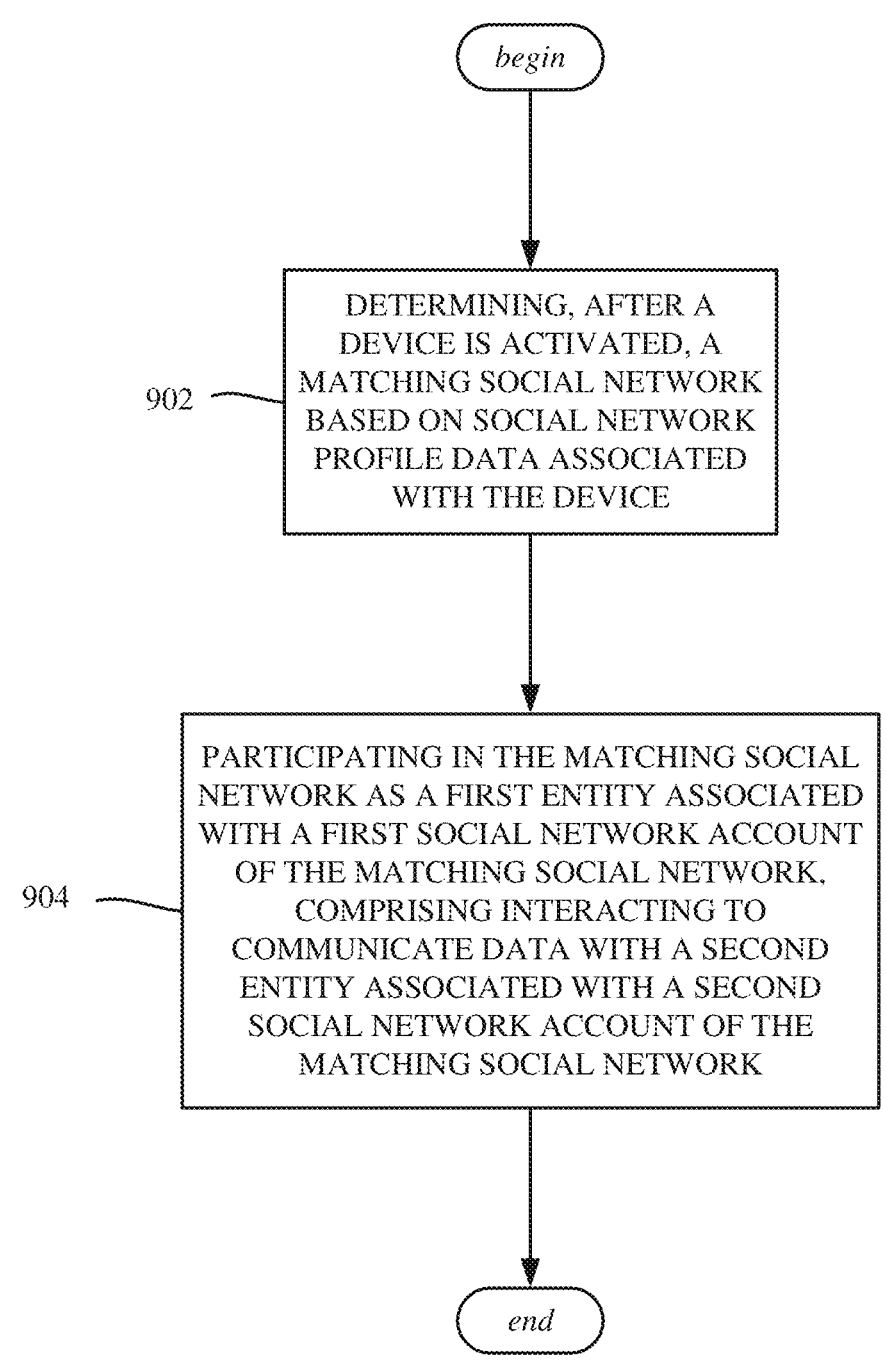
FIG. 9 is a flow diagram representing example operations related to a device participating in a social network that matches profile data, in accordance with various aspects and embodiments of the subject disclosure.

One or more example aspects are represented in FIG. 9, and can correspond to a device, including a processor, and a memory that stores executable instructions that, when executed by the processor, facilitate performance of operations. Example operation 902 represents determining, after the device is activated, a matching social network based on social network profile data associated with the device. Example operation 904 represents participating in the matching social network as a first entity associated with a first social network account of the matching social network, comprising interacting to communicate data with a second entity associated with a second social network account of the matching social network.

Further operations can include, in response to the device being activated, creating the social network profile data.

Determining the matching social network can include searching for the matching social network matches based on the social network profile data. Determining the matching social network can include creating the matching social network when no matching social network is found via the searching.

Further operations can include associating the device on the matching social network with identity data of the first entity.

Further operations can include, prior to participating in the matching social network, requesting approval, via user input associated with the first entity, to participate in the matching social network, and, in response to the requesting the approval, receiving the approval to participate in the matching social network based on the user input. The device can be a first device, the second entity of the matching social network can include at least one of: a second device, or a human.

The matching social network can be a first social network, and participating in the matching social network can include at least one of: communicating to promote the device on the matching social network, or communicating to promote the device on a second social network linked to the matching social network. The device can be a first device, and participating in the matching social network can include communicating to alert a second device based on a message from the first social network or the second social network.

The device can be a smart device coupled to at least one of: a camera, image recognition logic, a microphone, audio recognition logic, location determination logic, a motion sensor, a code scanner, a contact sensor, a lighting sensor, a temperature sensor, a humidity sensor, or a speaker. Other sensors may include those that touch users and/or their environments, such as (but not limited to) biometric sensors (e.g., for sensing pulse, salinity, excitement), health sensors (e.g., for sensing water content, fat content, fluid or air viscosity), genetic sensors (e.g., for sensing pheromone, odor, or chemical), proximity sensors (e.g., for sensing electromagnetic radiation, thermal), environmental sensors (e.g., for sensing smoke, particulate matter) and the like.

Further operations can include collecting performance data associated with operation of the device; participating in the matching social network can include uploading at least part of the performance data to the matching social network.

Further operations can include evaluating current operating condition data of the data relative to operational data accessed via the matching social network, and modifying the current operating condition data to modified operating condition data of the device based on the evaluating.

Figure 10:
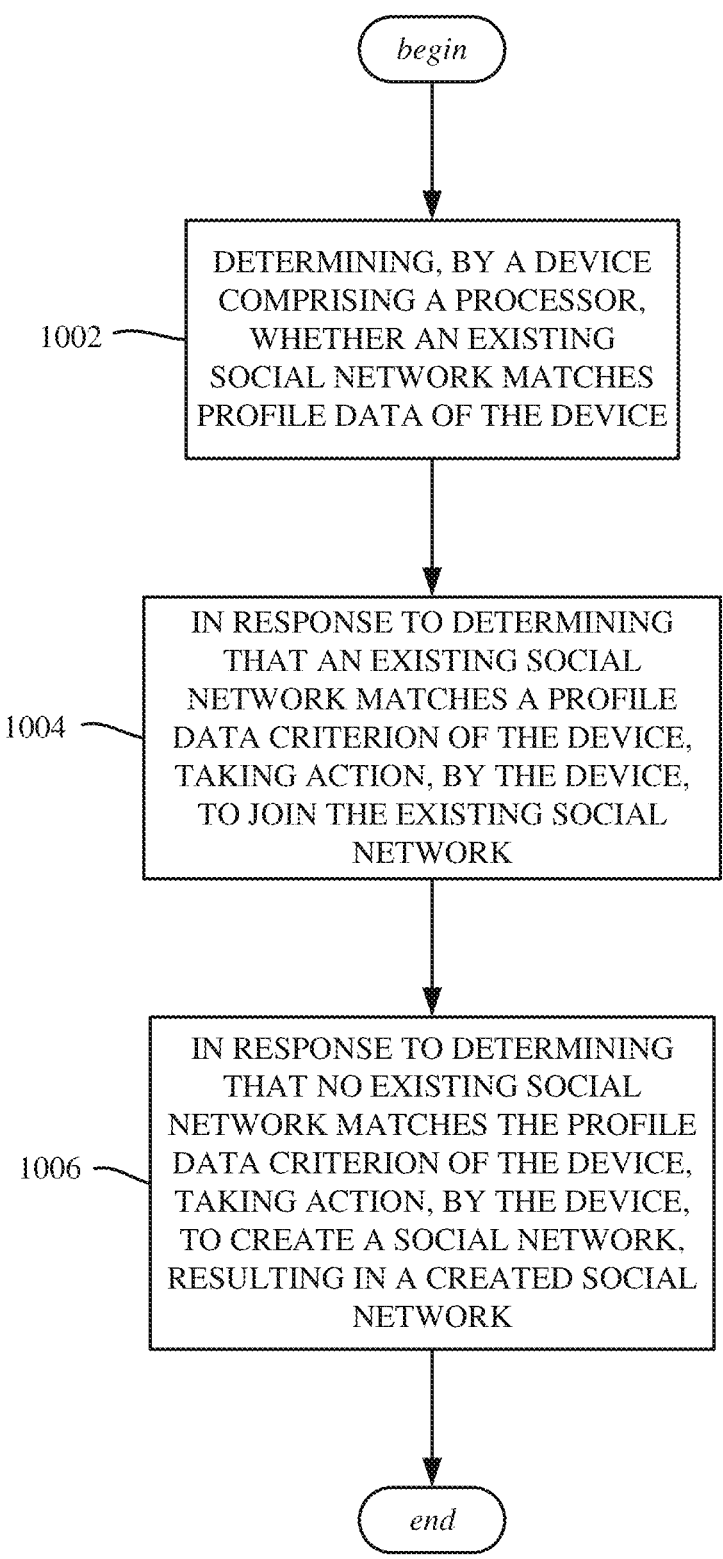
FIG. 10 is a flow diagram representing example operations related to determining whether a social network exists for joining by a device, and if so joining the existing social network, and if not creating a social network, in accordance with various aspects and embodiments of the subject disclosure.

One or more example aspects are represented in FIG. 10, and, for example, can correspond to operations, such as of a method. Example operation 1002 represents determining, by a device comprising a processor, whether an existing social network matches profile data of the device. Example operation 1004 represents, in response to determining that an existing social network matches a profile data criterion of the device, taking action, by the device, to join the existing social network. Example operation 1006 represents, in response to determining that no existing social network matches the profile data criterion of the device, taking action, by the device, to create a social network, resulting in a created social network.

The existing social network can match the profile data criterion, and further operations can include promoting, by the device, the device via the existing social network.

No existing social network can match the profile data criterion, and further operations can include promoting, by the device, the device via the created social network.

Taking the action by the device to join the existing social network can include obtaining approval from user input received via the device.

Taking the action by the device to join the existing social network can include registering device identity data and device profile data with the existing social network.

Taking the action to obtain the approval to create the social network can include obtaining the approval from user input received via the device, and registering device identity data and device profile data with the created social network.

Figure 11:
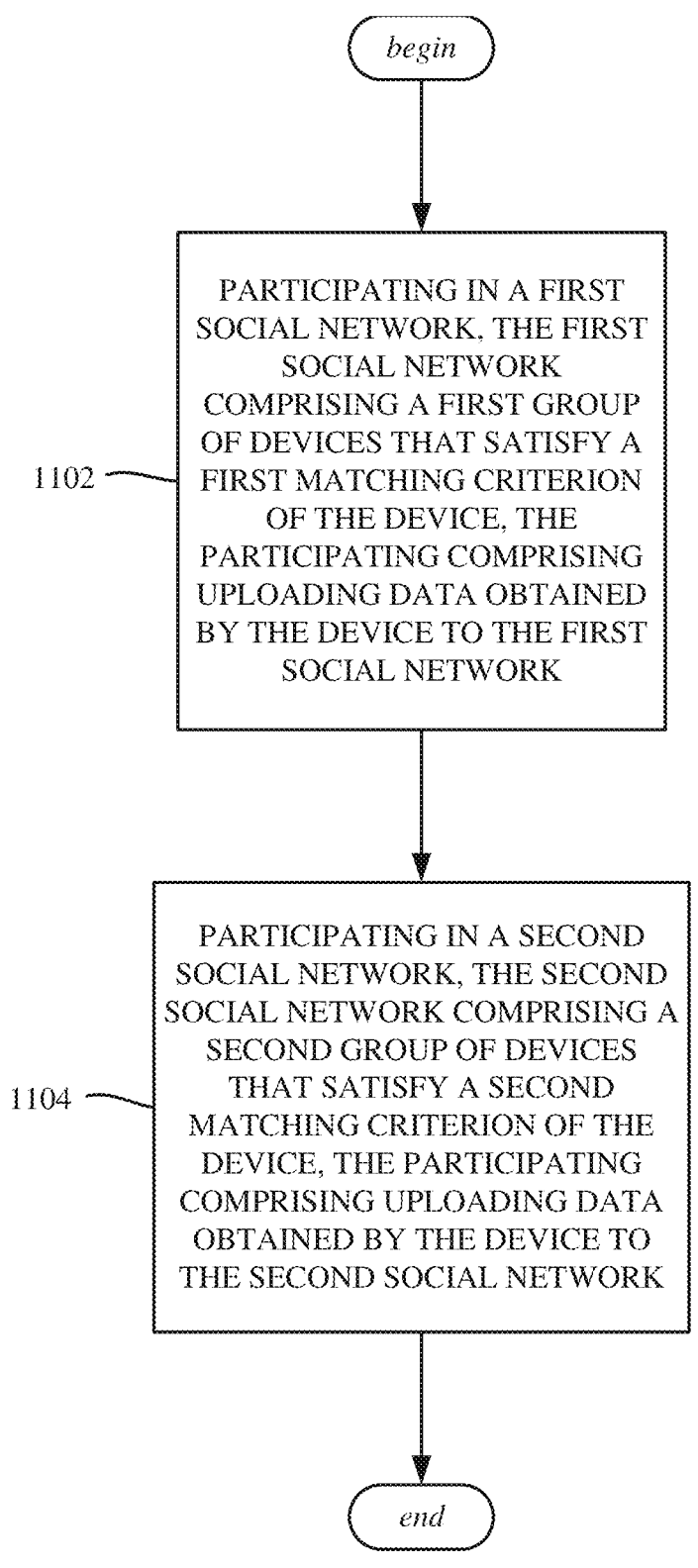
FIG. 11 is a flow diagram representing example operations related to a device participating in a first social network and a second social network, in accordance with various aspects and embodiments of the subject disclosure.

One or more aspects are represented in FIG. 11, such as implemented in a machine-readable medium, including executable instructions that, when executed by a processor of a device, facilitate performance of operations. Example operation 1102 represents participating in a first social network, the first social network comprising a first group of devices that satisfy a first matching criterion of the device, the participating comprising uploading data obtained by the device to the first social network. Example operation 1104 represents participating in a second social network, the second social network comprising a second group of devices that satisfy a second matching criterion of the device, the participating comprising uploading data obtained by the device to the second social network.

The first matching criterion can correspond to first characteristic data of the device, the second matching criterion can correspond to second characteristic data of the device that changes over time relative to the first characteristic data of the device, and further operations can include halting the participating in the first social network in response to the first characteristic data of the device changing to the second characteristic data of the device.

Participating in the first social network can include collecting data at the device, and promoting the device by sharing the data on at least one of: the first social network, or a third social network linked to the first social network.

As can be seen, the technology described herein facilitates connected, intelligent devices (nonhuman entities including sensors) to autonomously create and participate in social networks with other such devices. The social networks of the nonhuman entities can function to enable sharing of information such as usage trends, sensor readings, intelligence (including machine learning knowledge, recommendations, and other information). Such sharing may be done among a social group of two or more nonhuman entities. Each nonhuman entity optionally may be associated with one or more human users and thereby enable connections and communications among the human users. Such social networks may include human entities as well.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mm Wave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 12:
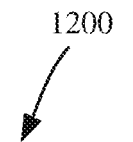
FIG. 12 illustrates an example block diagram of an example mobile handset operable to engage in a system architecture that facilitates wireless communications according to one or more embodiments described herein.

Referring now to FIG. 12, illustrated is a schematic block diagram of an example end-user device (such as user equipment) that can be a mobile device 1200 capable of connecting to a network in accordance with some embodiments described herein. Although a mobile handset 1200 is illustrated herein, it will be understood that other devices can be a mobile device, and that the mobile handset 1200 is merely illustrated to provide context for the embodiments of the various embodiments described herein. The following discussion is intended to provide a brief, general description of an example of a suitable environment 1200 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1200 includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks.

The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1294) through a hardwire connection, and other serial input devices (e.g., a keyboard, keypad, and mouse). This supports updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communication component 1210 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1222 (e.g., a camera) can be provided for decoding encoded multimedia content. The video processing component 1222 can aid in facilitating the generation, editing and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1238 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 810, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Figure 13:
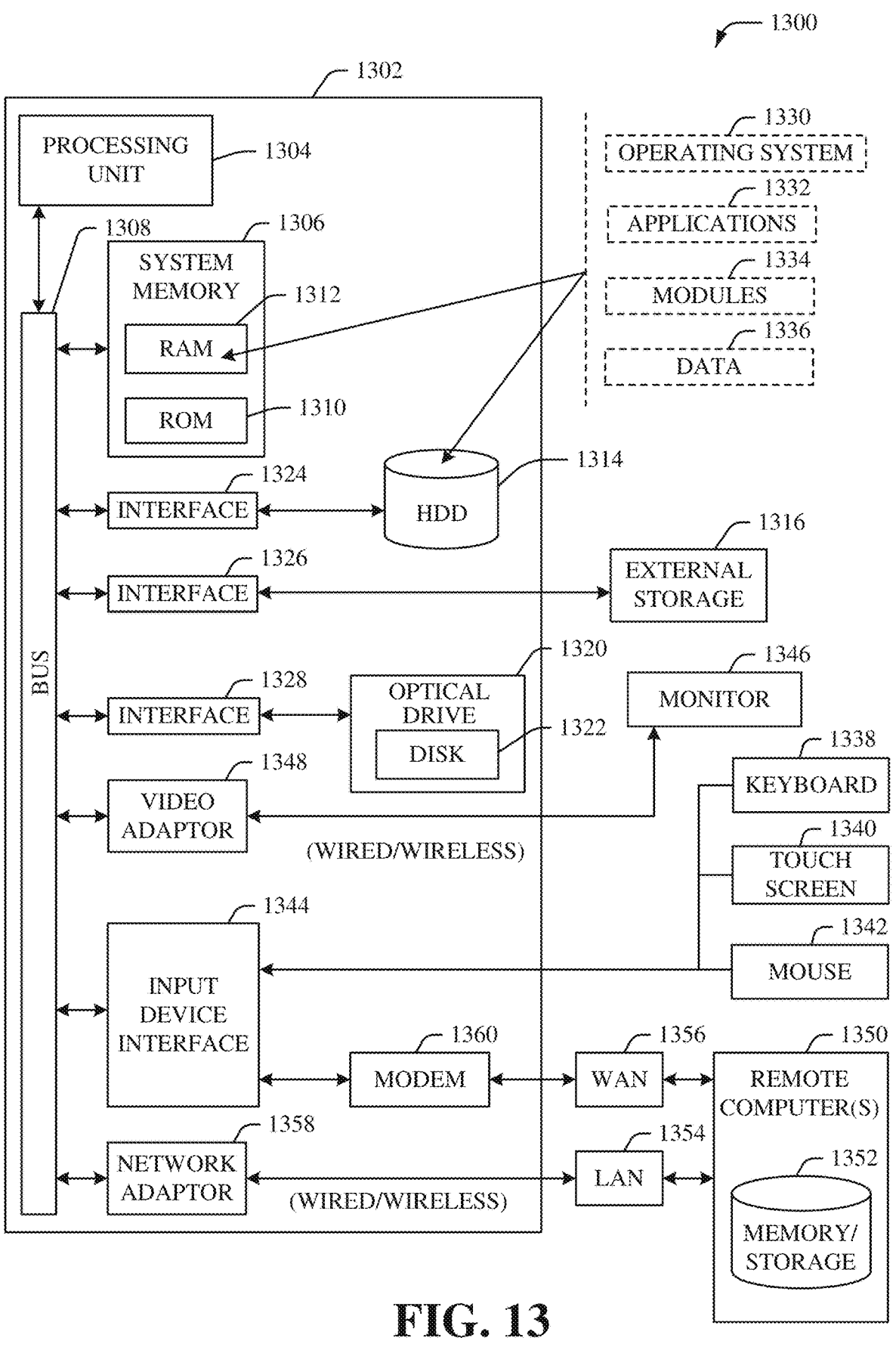
FIG. 13 illustrates an example block diagram of an example computer/machine system operable to engage in a system architecture that facilitates wireless communications according to one or more embodiments described herein.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD), non-volatile memory and other storage technology could be used in addition to, or in place of, an HDD 1314, and can be internal or external. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1294 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally include emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can include one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1294 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 13 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media.

Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A device, comprising:
a processor; and
a memory that stores executable instructions that, when executed by the processor of the device, facilitate performance of operations, the operations comprising:
enabling a first device and a second device of a plurality of devices to participate in a matching social network such that the first device interacts with the second device;
based on first sensor data of the first device, broadcasting second sensor data of the second device using the matching social network, wherein the first device is a wearable device and transmits a current location, and the second device is arranged in proximity to the current location of the first device and posts a video feed of an object wearing the first device; and
enabling the plurality of devices to perform a self-update, a request of a hardware update, and self-adjustment of settings which are learned from one or more of other devices of the plurality of devices using the matching social network.

2. The device of claim 1, wherein the operations further comprise:
implementing a data structure that contains social network profile data of a plurality of devices, wherein the social network profile data comprise a plurality of data fields associated with each of a plurality of devices, and wherein the plurality of data fields comprises a device identification (ID), an owner, a model serial number, a location, a capability, an activation date, usage characteristics, social network memberships, relevant sensor data, or a combination thereof.

3. The device of claim 2, wherein the plurality of data fields of the first device includes a dynamic field.

4. The device of claim 2, wherein the operations further comprise:
in response to each device being activated, creating the social network profile data of the activated device;
searching for the matching social network matches based on the created social network profile data; and determining the matching social network based on the created social network profile data associated with each device of the plurality of devices.

5. The device of claim 4, wherein determining the matching social network comprises creating the matching social network when no matching social network is found via the searching.

6. The device of claim 1, wherein the operations further comprise associating the first device on the matching social network with identity data of a first user device.

7. The device of claim 6, wherein the operations further comprise, prior to participating in the matching social network, receiving an approval request, via user input associated with the first user device, to participate in the matching social network, and, in response to the approval request, sending an approval to participate in the matching social network based on the user input associated with the first user device.

8. The device of claim 1, wherein the operations further comprise enabling each of the plurality of devices to compare its own condition with the one or more of other devices of the plurality of devices using the matching social network.

9. The device of claim 1, wherein the matching social network is a first social network, and wherein the participating in the matching social network further comprises at least one of: communicating to promote the first device on the matching social network, communicating to promote the first device on a second social network linked to the matching social network, or communicating to alert the second device based on a message from the first social network or the second social network.

10. The device of claim 1, wherein the plurality of devices includes a smart device coupled to at least one of sensors including: a camera, image recognition logic, a microphone, audio recognition logic, location determination logic, a motion sensor, a code scanner, a contact sensor, a lighting sensor, a temperature sensor, a humidity sensor, a speaker, a biometric sensor, a health sensor, a genetic sensor, a proximity sensor or an environmental sensor, and the smart device receives relevant sensor data output from the at least one of sensors.

11. The device of claim 1, wherein the operations further comprise:
collecting performance data associated with operation of the plurality of devices, and
enabling the plurality of devices to upload at least part of the performance data to the matching social network.

12. A method, comprising:
in response to determining that an existing social network matches a profile data criterion of each of smart devices, taking action, by a user device comprising a processor, to join the existing social network, wherein each of smart devices is associated with the user device;
accessing, by the user device, relevant sensor data output from other smart devices which are associated with one or more of other user devices and have joined the existing social network, wherein:
the other smart devices include at least one wearable smart device, and the at least one wearable smart device transmits a current location,
another smart device, having joined the existing social network, is arranged in proximity to the current location of the at least one wearable smart device and transmits information about an object wearing the at least one wearable smart device, and the another smart device posts a video feed of the object wearing the at least one wearable smart device; and activating, by the user device, the smart devices to perform a self-update, a request of a hardware update, and self-adjustment of settings, wherein the self-update, the hardware update, and the self-adjustment of the settings of the smart devices are learned from the other smart devices using the joined existing social network.

13. The method of claim 12, further comprising:

determining, by the user device, whether the existing social network matches profile data of smart devices associated with the user device, wherein the smart devices include one or more sensors that output relevant sensor data and wherein each profile data of the smart devices comprise a plurality of data fields including a device identification (ID), an owner, a model serial number, a location, a capability, an activation date, usage characteristics, social network memberships, the relevant sensor data, or a combination thereof, wherein the plurality of data fields of the at least one wearable smart device includes a dynamic field.

14. The method of claim 12, further comprising:

communicating with the smart devices, by the user device, via a user interface of the user device; and transmitting, by the user device, a report of events and operating conditions of the smart devices associated with the user device to the joined existing social network.

15. The method of claim 12, further comprising:

receiving, by the user device, an alert or a prompt on usage behaviors of the smart devices on a user interface of the user device; and enabling, by the user device, each of the smart devices to compare its own condition with the one or more of the other smart devices which have joined the existing social network.

16. A non-transitory machine-readable medium, comprising executable instructions that, when executed by a processor of a device, facilitate performance of operations, the operations comprising:

registering a first group of devices in a devices social network based on a first selection input by a first user device;

registering a second group of devices in the devices social network based on a second selection input by a second user device, wherein the second group of devices includes at least one wearable device, wherein the at least one wearable device transmits a current location and another smart device, having joined the devices social network, is arranged in proximity to the current location of the at least one wearable device and transmits information about an object wearing the at least one wearable device, and wherein the another smart device posts a video feed of the object wearing the at least one wearable device; and learning a self-update, a request of a hardware update, and a self-adjustment of settings of the first group of devices from one or more of devices registered in the devices social network.

17. The non-transitory machine-readable medium of claim 16, wherein the operations further comprise:

implementing a data structure that contains profile data of the first group of devices and the profile data of the second group of devices, each of the first group of devices and each of the second group of devices including one or more sensors that output relevant sensor data, the first group of devices associated with a first user device and the second group of devices associated with a second user device.

18. The non-transitory machine-readable medium of claim 17, wherein each profile data of the first group of devices and each profile data of the second group of devices comprise a plurality of data fields including a device identification (ID), an owner, a model serial number, a location, a capability, an activation date, usage characteristics, social network memberships, the relevant sensor data, or a combination thereof, and wherein the plurality of data fields of the at least one wearable device includes a dynamic field.

19. The non-transitory machine-readable medium of claim 17, wherein the operations further comprise enabling the first user device to access the relevant sensor data that are available at different locations of the at least one wearable device.

20. The non-transitory machine-readable medium of claim 17, wherein the operations further comprise broadcasting the relevant sensor data obtained from the at least one wearable device in the devices social network.

* * * * *